United States Patent
Bacon

(10) Patent No.: US 7,633,260 B2
(45) Date of Patent: Dec. 15, 2009

(54) APPARATUS AND METHOD FOR STARTING AND STOPPING AN AC INDUCTION MOTOR

(75) Inventor: Hilton Raymond Bacon, 1st Floor, 77A, Kau Lung Hang Village, Tai Po, New Territories, Hong Kong (HK)

(73) Assignee: Hilton Raymond Bacon, Hong Kong (HK)

( * ) Notice: Subject to any disclaimer, the term of this patent is extended or adjusted under 35 U.S.C. 154(b) by 282 days.

(21) Appl. No.: 11/932,001

(22) Filed: Oct. 31, 2007

(65) Prior Publication Data

US 2009/0108795 A1 Apr. 30, 2009

(51) Int. Cl.
*H02P 1/16* (2006.01)
(52) U.S. Cl. ............................ 318/778; 318/786; 310/89
(58) Field of Classification Search ................. 318/799, 318/800, 778, 786; 310/184, 89
See application file for complete search history.

(56) References Cited

U.S. PATENT DOCUMENTS

| | | | | |
|---|---|---|---|---|
| 5,075,585 | A | * | 12/1991 | Teruyama et al. .............. 310/89 |
| 5,341,080 | A | | 8/1994 | Agut Sanz |
| 5,969,497 | A | * | 10/1999 | McDonald et al. ........... 318/778 |
| 6,380,708 | B1 | | 4/2002 | Gritter et al. |
| 6,787,960 | B2 | | 9/2004 | So et al. |
| 6,870,333 | B2 | * | 3/2005 | Griepentrog et al. ......... 318/257 |
| 7,471,058 | B2 | * | 12/2008 | Duarte et al. ................ 318/791 |

FOREIGN PATENT DOCUMENTS

| | | |
|---|---|---|
| CN | 2066614 | 11/1990 |
| CN | 2073631 U | 3/1991 |
| CN | 2161017 Y | 4/1994 |
| CN | 2279028 | 4/1998 |
| CN | 1267127 A | 9/2000 |
| CN | 2636498 Y | 8/2004 |
| JP | 11231950 | 8/1990 |
| JP | 3-143281 | 6/1991 |
| JP | 2002237420 | 8/2002 |
| JP | 2003229315 | 8/2003 |

OTHER PUBLICATIONS

Bruce, Frank M., et al.. "Reduced-Voltage Starting of Squirrel-Cage Induction Motors", IEEE Transactions on Industry Applications, Jan./Feb. 1984, pp. 46-55, vol. 1A-20, No. 1.

(Continued)

*Primary Examiner*—Rina I Duda
(74) *Attorney, Agent, or Firm*—Stephen M. De Klerk; Sonnenschein, Nath & Rosenthal LLP

(57) ABSTRACT

An apparatus for controlling the starting and stopping of an AC induction motor, the apparatus comprises a first and a second magnetic permeable portions having a plurality of legs wherein a magnetic control flux of the second magnetic has an opposite magnetic polarity to the magnetic control flux of the first magnetic permeable portion; anon-spacer separating the first and second magnetic permeable portions to prevent magnetic control flux cancellation between the first and second magnetic permeable portions; a first and second AC power phase windings; and a first and second group of DC excitation control windings.

15 Claims, 13 Drawing Sheets

OTHER PUBLICATIONS

Farr, Lawrence B., et al., "Considerations in Medium Voltage Reduced Voltage Motor Starting the Good, the Bad and the Ugly", Petroleum and Chemistry Industry Technical Conference, 2007, PCIC apos;07. IEEE, vol. Issue, 17-19, Sep. 2007.

Foulon, N., et al., "Investigation of the Failure Mechanism of Insulation Subjected to Repetitive Fast Voltage Surges", Electrical Insulation Conference, 1997, and Electrical Manufacturing & Coil Winding Conference Proceedings, pp. 401-406, vol. —Issue 22-25, Sep. 1997.

Kay, John A., et al., "Methods for the Control of Large Medium-Voltage Motors: Application Considerations and Guidelines", IEEE Transactions on Industry Applications, vol. 36 No. 6, pp. 1688-1696, Nov./Dec. 2000.

Richards, Gill G., et al., "Limiting Induction Motor Transient Shaft Torques Following Source Discontinuities", IEEE Transactions on Energy Conversion, pp. 250-256, vol. 13 No. 3, Sep. 1998.

Telander, Stanton H., et al., "Surge Limiters for Vacuum Circuit Breakers", IEEE Transactions on Industry Applications, pp. 554-559, vol. 24 No. 4, Jul./Aug. 1988.

Vollet, Caroline et al., "Protecting High-Voltage Motors Against Switching Overvoltages", Electrical and Instrumentation Applications in the Petroleum & Chemical Industry, 2007, pp. 1-7, PCIC Europe 2007, Jun. 13, 2007.

PCT International Search Report and Written Opinion, International Patent Application No. PCT/CN2008/072081, International Filing Date: Aug. 21, 2008; mailing date of Search Report: Nov. 6, 2008.

Farr, Lawrence B., et al. "Medium-Voltage Reduced-Voltage Autotransformer Starter Failures—Explaining the Unexplained," IEEE Transactions on Industry Applications, Mar./Apr. 2005, pp. 502-506, vol. 41, No. 2, Vancouver, B.C., Canada.

* cited by examiner

APPARATUS AND METHOD FOR STARTING AND STOPPING AN AC INDUCTION MOTOR

TECHNICAL FIELD

The invention concerns an apparatus and method for controlling the starting and stopping of an AC induction motor.

BACKGROUND OF THE INVENTION

An AC induction motor is a type of electric motor for powering driven equipment. They are robust, reliable, and inexpensive and standardized throughout the world. Starting an AC induction motor requires a careful compromise between the cost of the motor starter apparatus, starting performance and the electric supply authorities regulations.

A basic method of starting an electric motor is by closing a contactor to allow the motor to start at full voltage as a direct-on-line starter. Although it is a compact and inexpensive method, it is not the best method to use. Direct-on-line starting is marked by inrush current surges of six to eight times the motor's full load ampere value, resulting in electrical surge transients as well as mechanical strain on driven equipment. It results in a fast breakaway and acceleration up to full speed in an uncontrolled fashion.

The effect upon a hydraulic pump is mechanical stress applied on the rotating components followed by surges in the hydraulic system. This may include a high initial flow rate causing a vacuum to be drawn on the suction side, pump cavitations and pressure pulsations at the pump discharge, Similar effects are found with mechanical loads such as conveyers (driven by a motor) which when subjected to sudden jerks or severe applications of torque, may lead to load displacement, conveyor belt slippage or breakage.

Equally, when stopping the rate of deceleration is totally uncontrolled, this leads to further mechanical stress on pipelines for pumping applications, mountings and check valves from the inertia of the flowing fluids. It also produces pressure surges in the hydraulic circuit leading to pipeline rupture and leakage of product.

To maintain continuity and quality of the supply of electricity, electric supply utilities apply service rules and regulations that limit the kW size of motors that can be connected with the direct-on-line method of starting which may affect other electric power consumers.

For large motors, from 35 kW up to 5000 kW, the supply authorities may require the application of reduced inrush current starting to limit the starting current surge to a low value.

Although there are numerous variations of motor starting with a reduced voltage, the prior art auto-transformer starter is the most efficient and common methodology for starting a large motor, because it is the only reduced voltage starter that can provide maximum starting torque with minimal line current; this is due to the transformation ratio of the number of turns of the primary and secondary windings of the auto-transformer.

Other known non-electronic types of reduced voltage starters are the primary reactor and primary resistance starters. Both primary reactor and primary resistance starters have similar starting characteristics and disadvantages as the direct-on-line starting methodology which causes transient current and torque peaks when changing from reduced voltage to full fine voltage.

SUMMARY OF THE INVENTION

In a first preferred aspect, there is provided an apparatus for controlling the starting and stopping of an AC induction motor, the apparatus comprising;
- a first magnetic permeable portion having first, second and third legs;
- a second magnetic permeable portion arranged relative to the first magnetic permeable portion such that a magnetic control flux of the second magnetic permeable portion has an opposite magnetic polarity to a magnetic control flux of the first magnetic permeable portion, the second magnetic permeable portion having fourth, fifth and sixth legs;
- a non-magnetic spacer separating the first and second magnetic permeable portions to prevent magnetic control flux cancellation between the first and second magnetic permeable portions;
- a first AC power phase winding wound around the first and fourth legs;
- a second AC power phase winding wound around the third and sixth legs;
- a first pair of DC excitation control windings mounted around the first magnetic permeable portion; and
- a second pair of DC excitation control windings mounted around the second magnetic permeable portion;
- wherein a magnetic power flux opposes the magnetic control flux in the first magnetic permeable portion and a magnetic power flux assists a magnetic control flux in the second magnetic permeable portion during a first half cycle, and a magnetic power flux assists a magnetic control flux in the first magnetic permeable portion and a magnetic power flux opposes a magnetic control flux in the second magnetic permeable portion during a second half cycle, such that the impedance of the AC power phase windings is changed by an equal and symmetrical variation of the density of the combined magnetic fluxes in each of the magnetic permeable portions during a complete power cycle to produce a balanced voltage with a symmetrical waveform from each of the AC power phase windings.

The apparatus may further comprise a third AC power phase winding wound around the second the fifth legs.

The DC excitation control windings may all have the same number of turns.

Each magnetic permeable portion may comprise:
- an upper cross-bar yoke connecting an upper portion of each leg, and
- a lower cross-bar yoke connecting a lower portion of each leg.

Each AC power phase winding may have substantially equal magnetic saturation levels.

The AC power phase winding may be a single continuous winding with a plurality of voltage taps.

The AC power phase winding may be at least two separate coils having an equal number of turns, each coil having a plurality of voltage taps.

The apparatus may further comprise a switch connected at a 50% voltage tap of each AC power phase winding to reduce stress on insulation of the AC power phase winding.

The apparatus may further comprise a third magnetic permeable portion, the third magnetic permeable portion omitting DC excitation control windings.

The third magnetic permeable portion may have an air gap and is isolated by non-magnetic spacers to prevent magnetic control flux cancellation between the first and second magnetic permeable portions.

The DC excitation control windings may be a plurality of control windings for inducing magnetic control fluxes in the magnetic permeable portions, and the flow of magnetic control flux in the magnetic permeable portions have substantially equal flux densities and the magnetic flux flows in the first magnetic permeable portion in opposition to the second magnetic permeable portion.

The first pair of DC excitation control windings may be wound around the upper cross-bar yoke of the first magnetic permeable portion between the first and second legs and between the second and third legs, and the second pair of DC excitation control windings is wound around the upper cross-bar yoke of the second magnetic permeable portion between the fourth and fifth legs and between the fifth and sixth legs.

The first pair of DC excitation control windings may be connected in series and supplied with DC amperes, and the DC amperes induce a magnetic control flux to flow in an upwardly direction on the second leg, and in a downwardly direction on the first and third legs The second pair of DC excitation control windings may be connected in series and supplied with DC amperes, and the DC amperes induce a magnetic control flux to flow in an downwardly direction on the fifth leg, and in a upwardly direction on the fourth and sixth legs The apparatus may further comprise:
an input connection to the AC power phase windings for connection to a three phase AC power system;
an output connection to a load from selected reduced voltage taps of the AC power phase windings;
a common connection to each A.C. power phase winding for connection to a common circuit point; and
an input connection to each pair of DC excitation control windings.

It is an advantage of at least one embodiment of the present invention to use impedance of a variable reactor to symmetrically ramp-up the available voltage to the motor terminals during the second starting stage and control deceleration of the driven load during a motor stop sequence.

The progressive increase of impedance of the present invention and also an improved magnetic core assembly symmetrically reduces the available voltage to the motor terminals. This allows a motor stop with a ramp-down from the motors full load speed in a controllable manner.

Another advantage of at least one embodiment of the present invention is that the continuously variable, control of reactor impedance values for the second step allows a wider range of motor kW sizes to be utilized for a given physical size of a variable reactor/auto-transformer apparatus.

A further advantage of at least one embodiment of the present invention is having the first step as a reduced voltage auto-transformer apparatus, and a second starting step that includes an improved means of DC control. The improved magnetic core assembly enables a smooth switch-over into a variable reactor control connection.

One feature of the present invention is that pairs of DC control windings are connected in series opposition such that any AC induced in these DC control windings by the AC power phase windings cancels out and the resultant voltage across the excitation circuit is substantially zero.

Another feature of the invention is that the physical construction and electrical engineering requirement for manufacture does not depart from typical transformer construction techniques used by prior art auto-transformer starters. In other words, the construction may utilize a 3-coil set of windings, identified as a "wye (star point)" configuration with one set of coils per phase. This allows balanced load sharing between the three phases or utilizes 2-coil set of windings where the central phase does not include a coil set of windings. This results in a slight imbalance compared with the above mentioned 3-coil set construction. The 2-coil set of windings is identified as an "open-delta" configuration.

BRIEF DESCRIPTION OF THE DRAWINGS

An example of the invention will now be described with reference to the accompanying drawings, in which.

DETAILED DESCRIPTION OF THE DRAWINGS

Figure 1:
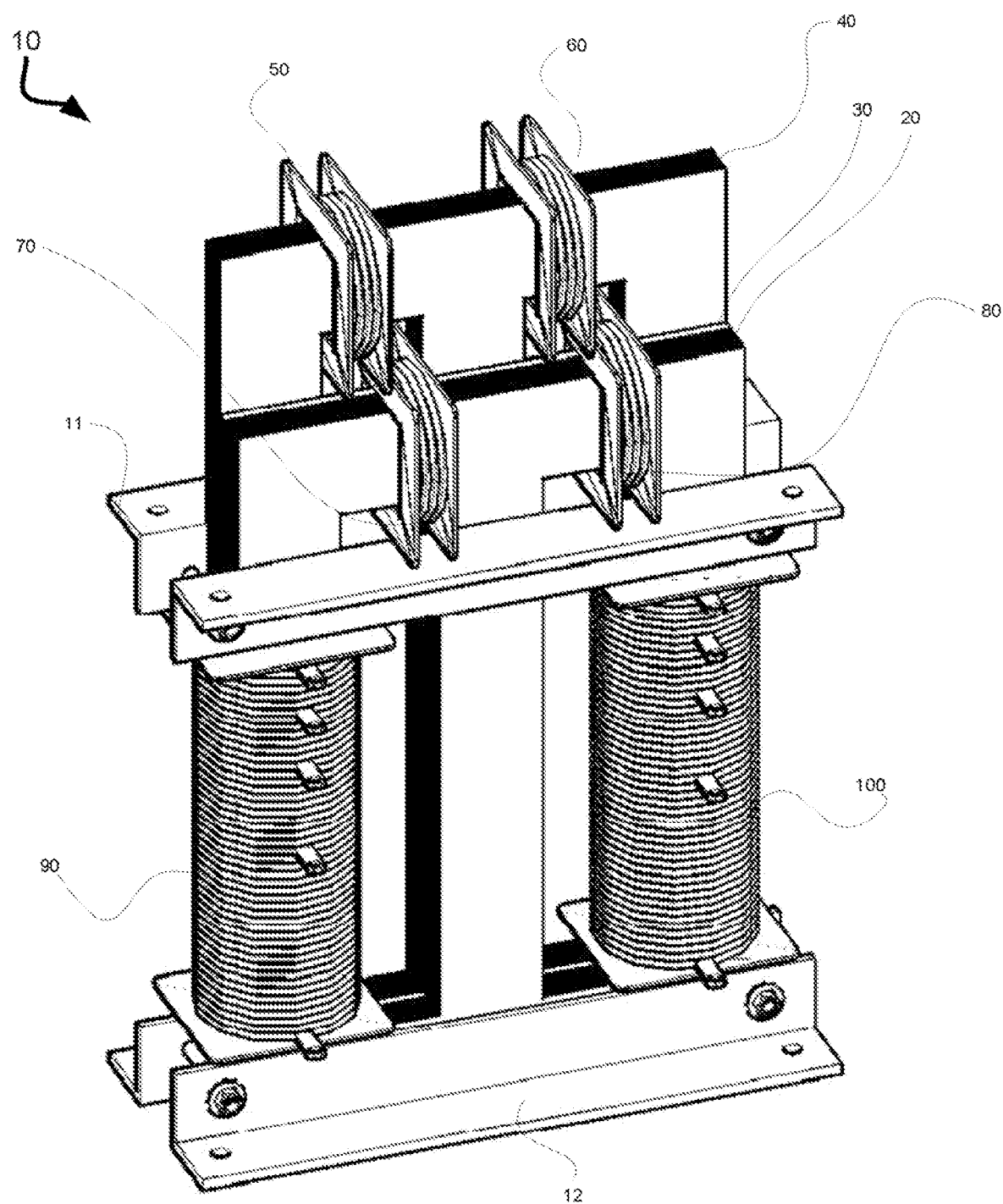
FIG. 1 is a perspective view of a 2-coil variable reactor/auto-transformer apparatus for use in a polyphase induction motor starter according to a first embodiment of the invention.

Referring to FIG. 1, a perspective view of a 2-coil variable reactor/auto-transformer apparatus 10 according to a first embodiment is shown. The apparatus 10 is used in a motor starter (not shown) to supply starting current to a polyphase induction motor.

The apparatus 10 may be used for starting, and stopping the motor with deceleration.

The apparatus 10 generally comprises a magnetic core assembly having magnetic properties that is assembled from transformer core laminations arranged in an "EI" arrangement. The apparatus 10 has at least two magnetically permeable portions or part cores 20, 40 made of a magnetic material having a magnetization curve with a pronounced knee. The first and second part cores 20, 40 are separated by a non-magnetic spacer 30. The first part core 20 is arranged relative to the second part core 40 such that a magnetic control flux of the first part core 20 has an opposite magnetic polarity to a magnetic control flux of the second part core 40. This enables symmetrical control of the output waveform of the AC to the induction motor. The components of the magnetic core assembly are held in position by upper brackets 11 and lower brackets 12.

Each part core 20, 40 has three legs. The first part core 20 has two lateral legs 21, 23 and a central leg 22. The second part core 40 also has two lateral legs 41, 43 and a central leg 42. The lateral legs 21, 23, 41, 43 have equal cross sectional areas and have respective AC power phase windings 90, 100 of AC phase coils mounted on them. The AC power phase windings 90, 100 have voltage taps similar to prior art autotransformers. The first AC power phase winding 90 is wound around the first pair of lateral legs 21, 41. The second AC power phase winding 100 is wound around the second pair of lateral legs 23, 43. The AC power phase windings 90, 100 are interlinked by the magnetic flux in the lateral legs 21, 23, 41, 43 they are mounted on.

A pair of DC excitation coils 70, 80 is mounted around the first pad core 20. Another pair of DC excitation coils 50, 60 is mounted around the second part core 40. The pairs of DC excitation coils 50, 60, 70, 80 enable the magnetic control flux in each part core 20, 40 to be varied. The DC excitation coils 70, 80 of the first part core 20 are connected in series and have the same number of turns as each other. The DC excitation coils 50, 60 of the second part core 40 are connected in series and have the same number of turns as DC excitation coils 70, 80 of the first part core 20. The windings of the DC excitation coils 50, 60, 70, 80 are interlinked by the magnetic flux in the respective part core 20, 40 they are mounted around. Thus, the first part core 20 has a set of DC excitation coils 70, 80 and the second part core 40 has a set of DC excitation coils 50, 60. Each pair of DC excitation coils 50, 60, 70, 80 are connected with an opposite polarity.

The DC excitation coils 70, 80 of the first part core 20 and the DC excitation coils 50, 60 of the second part core 40 are connected to a DC source for inducing a magnetic control flux to flow in each of the part cores 20, 40 since they are closed magnetic circuits. The direction of flow of the magnetic control flux in the part cores 20, 40 are in opposite directions to each other such that any AC induced in those DC excitation coils 50, 60, 70, 80 by the AC power phase windings 90, 100 cancels out and the resultant voltage across the excitation DC control circuit is substantially zero. A magnetic power flux opposes the magnetic control flux in the first part core 20 and a magnetic power flux assists a magnetic control flux in the second part core 40 during a first half cycle. A magnetic power flux assists a magnetic control flux in the first part core 20 and a magnetic power flux opposes a magnetic control flux in the second part core 40 during a second half cycle. This causes the impedance of the AC power phase windings 90, 100 to be changed by an equal and symmetrical variation of the density of the combined magnetic fluxes in each of the part cores 20, 40 during a complete power cycle to produce a balanced voltage with a symmetrical waveform from each of the AC power phase windings 90, 100.

Figure 2:
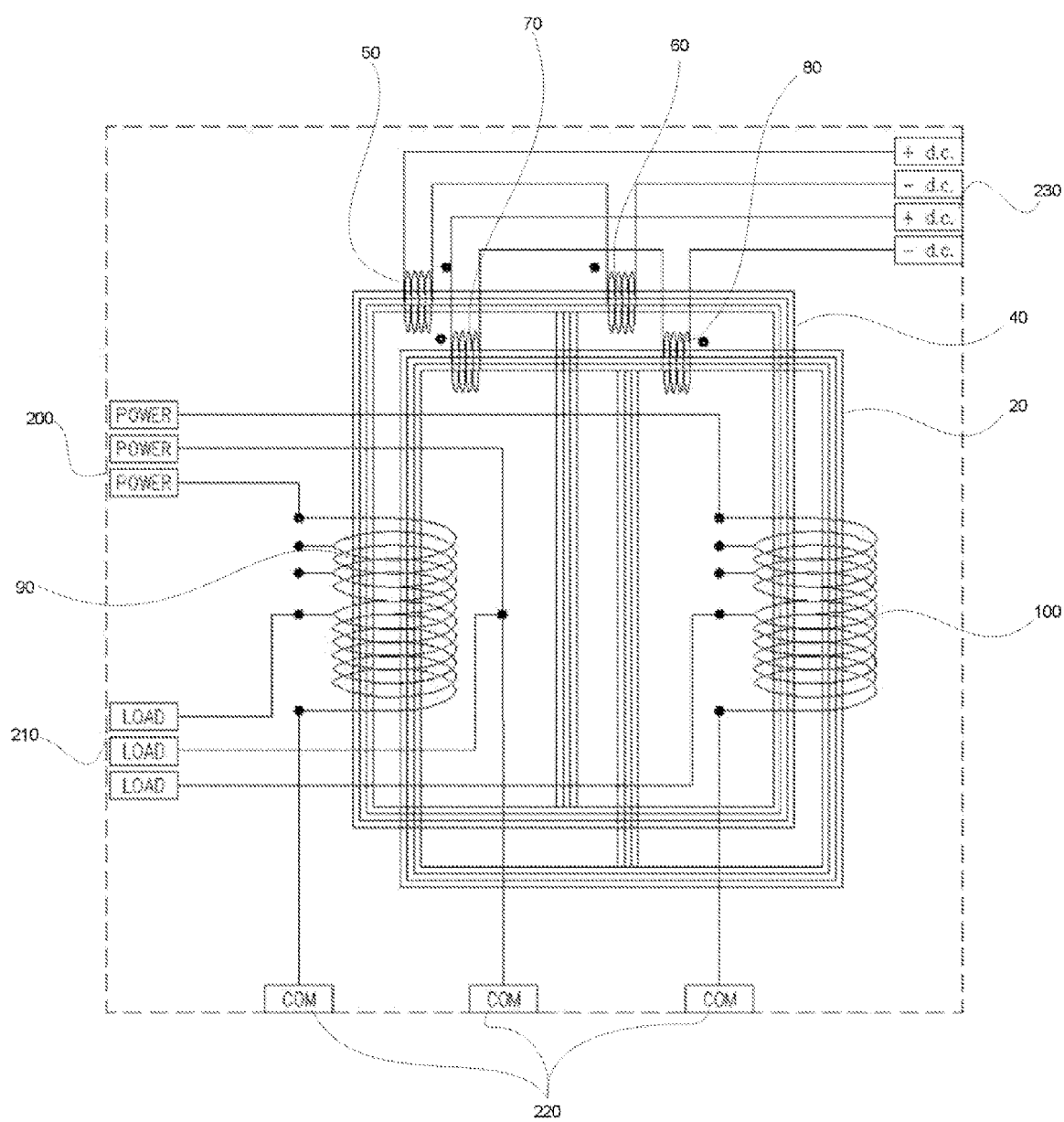
FIG. 2 is an electrical diagram of the apparatus of FIG. 1.

Referring to FIG. 2, an electrical diagram of the apparatus of FIG. 1 is shown. An input connection 200 to each AC power phase winding 90, 100 is provided for connection to an AC power system. There is an output connection 210 to a load from selected voltage taps of the AC power phase winding 90, 100. A common point connection 220 to each AC power phase winding 90, 100 for connection to a common star point is provided. An input connection 230 to each pair of DC excitation coils 50, 60, 70, 80 mounted on the part cores 20, 40 is provided.

Figure 3:
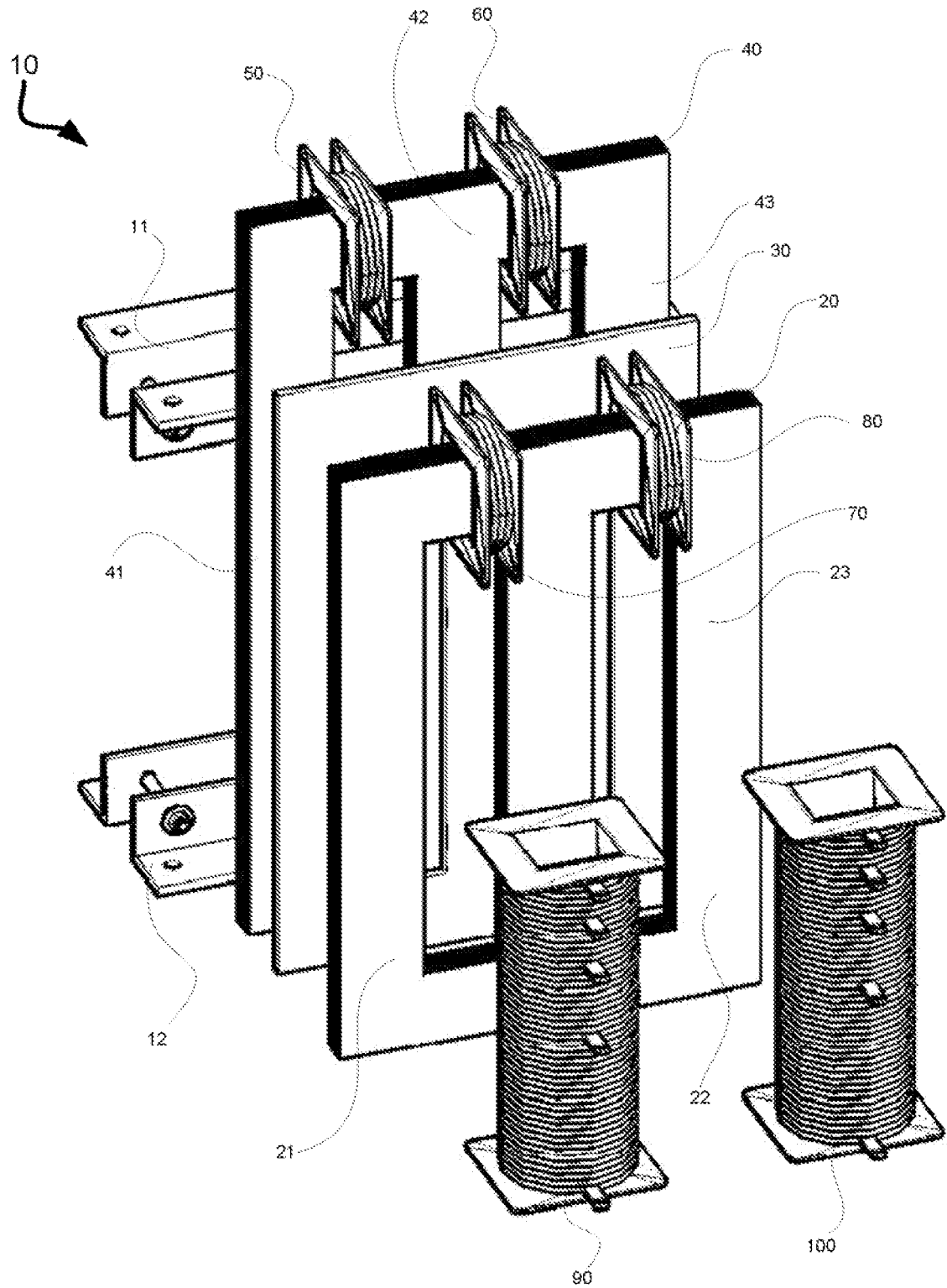
FIG. 3 is an exploded view of the magnetic core of FIG. 1.

FIG. 3 shows an exploded view of the magnetic core of FIG. 1. The arrangement of the magnetic part cores 20, 40 have substantially equal magnetic saturation levels.

Figure 4:
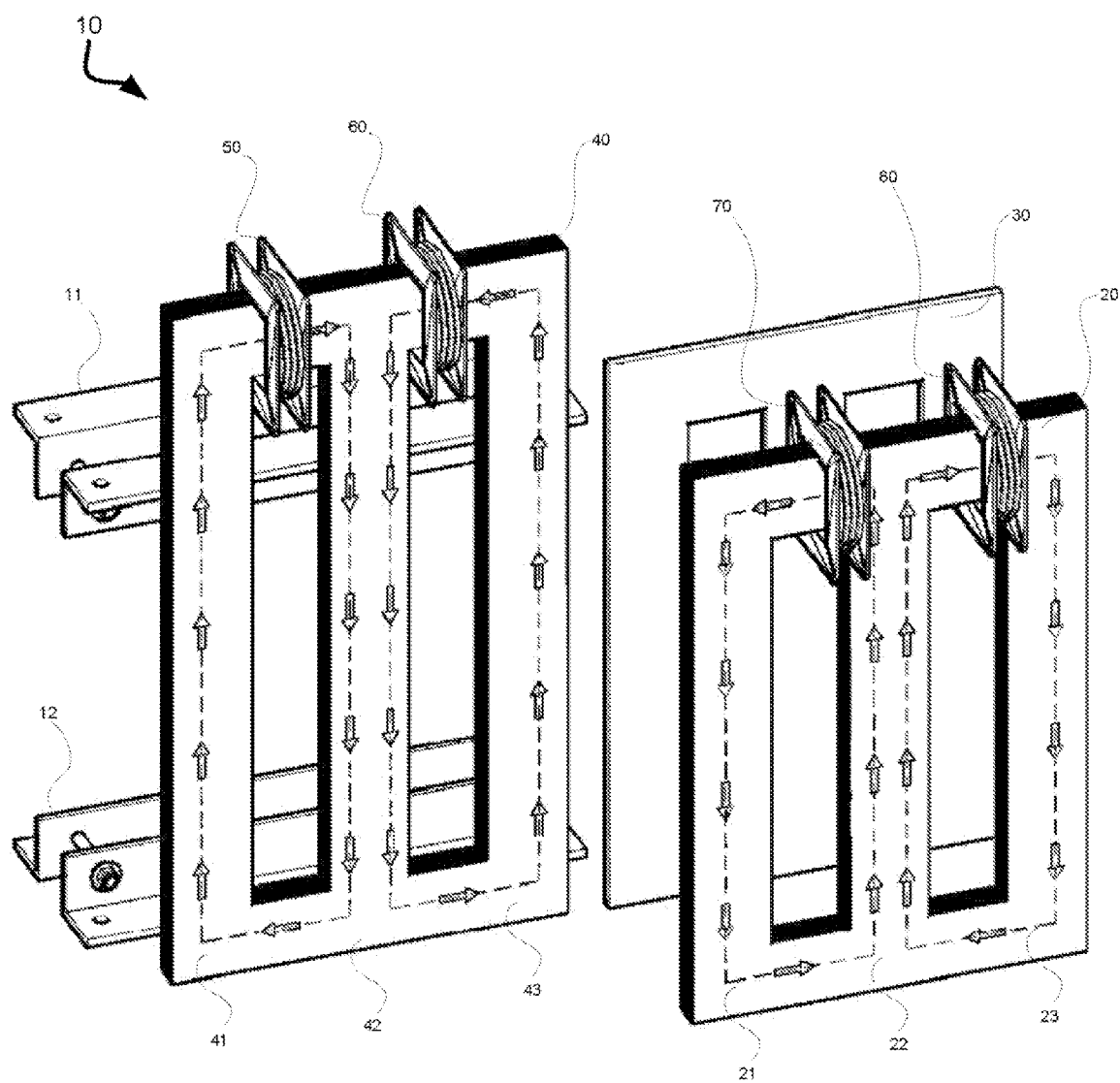
FIG. 4 is an exploded view of the magnetic core of FIG. 1 showing the direction of flow of the magnetic control flux.

FIG. 4 is an exploded view of the magnetic core of FIG. 1 showing the direction of flow of the magnetic control flux. The direction of flow of the magnetic control flux through each of the part cores 20, 40 is indicated by the arrows. When the first part core 20 is excited by applying DC excitation, a magnetic control flux is induced that flows in an upwards direction along the central leg 22. The second part core 40 induces a magnetic control flux that flows in a downwards direction along its central leg 42 when DC excitation is applied. Since the non-magnetic spacer 30 is sandwiched between the part cores 20, 40, any magnetic coupling is reduced and cancellation of the two equal and opposite magnetic control fluxes is prevented.

The impedance of the AC power phase windings 90, 100 is dependant upon the magnetic permeability of the magnetic core assembly. When DC is applied to the DC excitation coils 50, 60, 70, 80, the magnetic control fluxes in each part core 20, 40 are varied. An increase in DC to the DC excitation coils 50, 60, 70, 80 results in a decrease in the impedance of the AC power phase windings 90, 100 because of the increase of core saturation. This reduces the permeability of the magnetic core assembly and the impedance of the AC power phase windings 90, 100.

The amplitude of the DC applied to the DC excitation coils 50, 60, 70, 80 varies in relation to a desired electrical parameter that may be provided by a microprocessor based motor protection relay controller. The controller monitors the motor phase current during each stage of starting the motor. The controller has a memory to store a first predetermined current value which is indicative of a started motor and is able to compare the current levels with a second predetermined current value after the motor has started for causing the motor starter to switch to subsequent second stage as a variable reactor after a predetermined transition time/current value. The controller compares the current levels with a third predetermined current value after the motor has reached near operating speed for causing the motor starter to switch to full supply voltage. The controller switches a digital output for the transition from the auto-transformer connection for the first starting period. The controller also controls an analog DC output signal for the manipulation of DC excitation of the part cores 20, 40 during the second starting period as a variable reactor unit. The motor controller manipulates the analog DC output signal for desired motor operating parameters for rate of change during starting and deceleration during a stop command.

The amplitude of the DC magnetic control flux saturates the part cores 20, 40. This in turn deeply controls the permeability of the magnetic core assembly and therefore the impedance of the AC power phase windings 90, 100.

The AC power phase windings 90, 100 and the DC control windings 50, 60, 70, 80 are disposed with respect to the magnetic core assembly so that the AC and DC induces an AC magnetic power flux and a DC magnetic control flux in each leg 21, 22, 23, 41, 42, 43 of the magnetic core assembly. These fluxes assist each other or oppose each other when the AC has a positive or negative value respectively.

The pairs of DC control windings 50, 60, 70, 80 are connected in series opposition such that any AC induced in those DC control windings 50, 60, 70, 80 by the AC power phase windings 90, 100 cancels out. Any resultant voltage across the excitation circuit is substantially zero.

Figure 5:
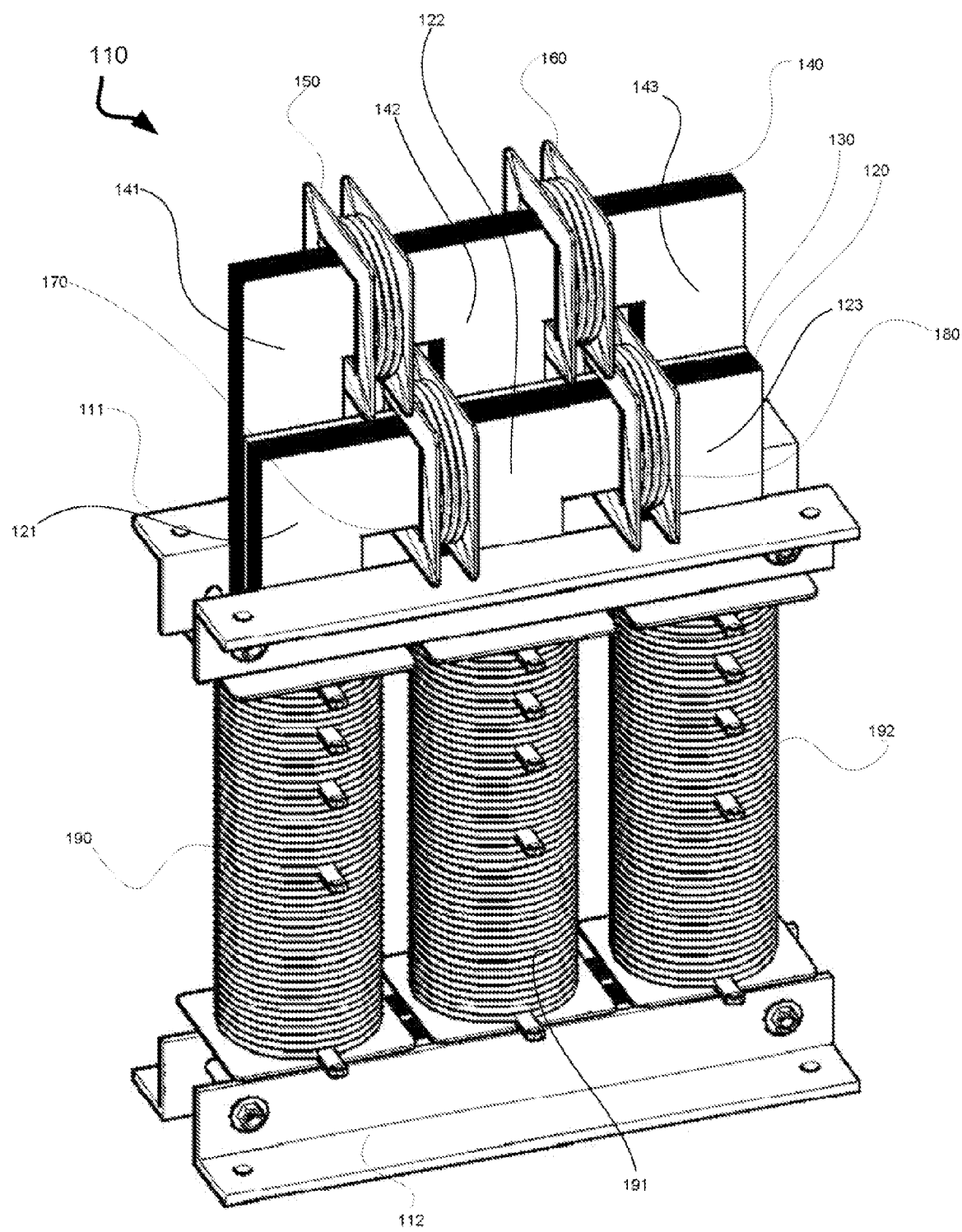
FIG. 5 is a perspective view of a 3-coil variable reactor/auto-transformer apparatus for use in a polyphase induction motor starter according to a second embodiment of the present invention.

Referring to FIG. 5, a 3-coil, variable reactor/auto-transformer apparatus 110 in accordance with a second embodiment is shown. The apparatus 110 is used in a motor starter to supply starting current to a polyphase induction motor (not shown).

The apparatus 110 may be used for starting the motor and stopping the motor with deceleration.

The apparatus 110 comprises a magnetic core assembly of transformer laminations of a magnetic material having a magnetization curve with a pronounced knee. The apparatus 110 is assembled into a typical EI construction with at least two part cores 120, 140. The first 120 and second 140 part cores have three legs 121, 122, 123 and 141, 142, 143, respectively. The part cores 120, 140 are separated by a non-magnetic spacer 130. A pair of DC excitation coils 170, 180 are wound around the first part core 120. Another pair of DC excitation coils 150, 160 is wound around the second part core 140.

All three pairs of legs 121, 141, and 122, 142 and 123, 143 have a respective AC power phase winding 190, 191, 192. The three AC power phase windings 190, 191, 192 have voltage taps similar to prior art auto-transformers. A first AC power phase winding 190 is wound around the first lateral legs 121, 141. A second AC power phase winding 191 is wound around the central legs 122, 142. A third AC power phase winding 192 is wound around the third lateral legs 123, 143. The windings of the AC power phase windings 191, 192, 193 are interlinked by the magnetic flux in the legs 121, 122, 123, 141, 142, 143 they are mounted on.

Figure 6:
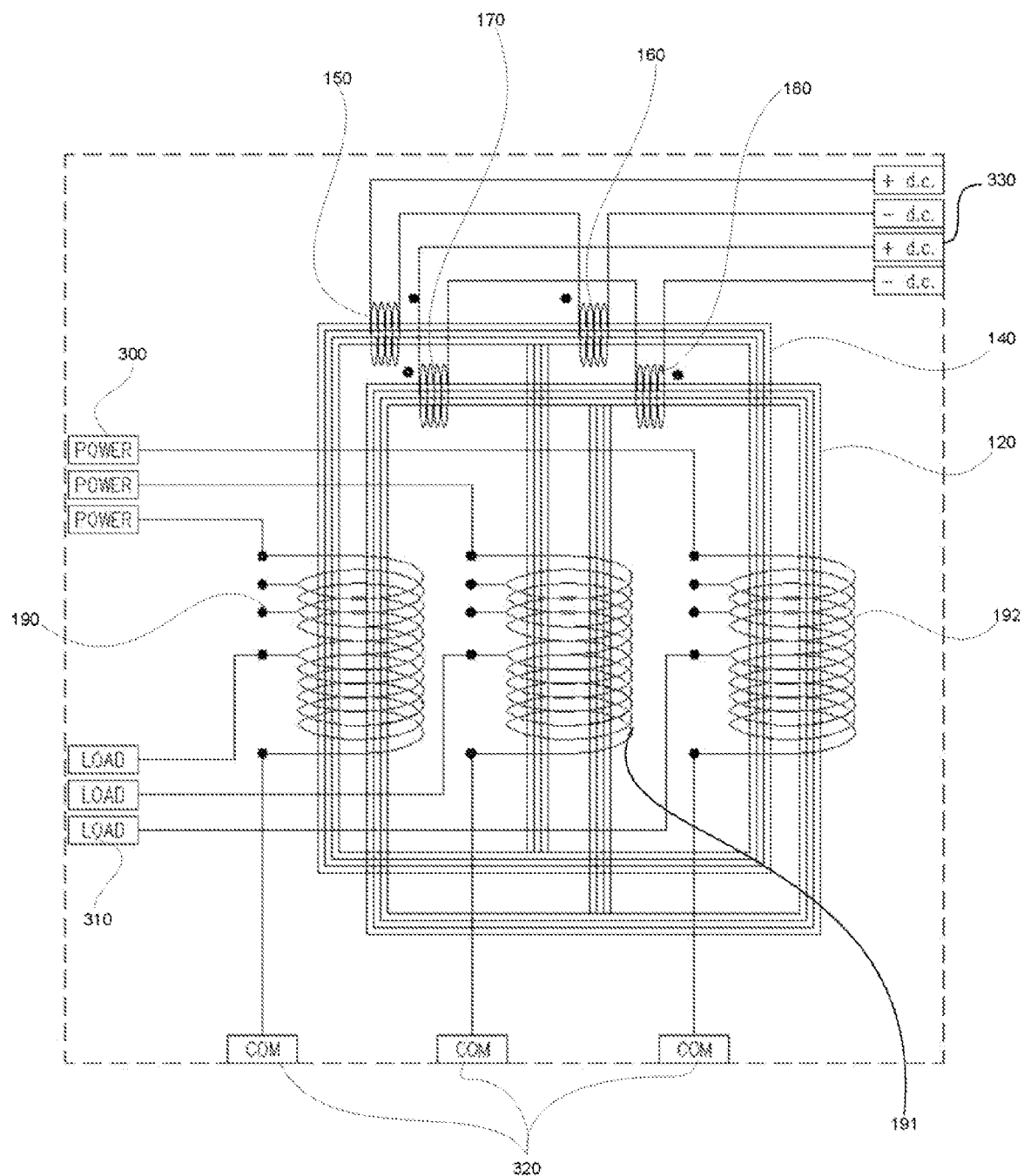
FIG. 6 is an electrical diagram of the apparatus of FIG. 5.

Referring to FIG. 6, an electrical diagram of the apparatus 110 of FIG. 5 is shown. An input connection 300 to each AC power phase winding 190, 191, 192 is provided for connection to an AC power system. An output connection 310 to a load from selected voltage taps of the AC power phase winding 190, 191, 192 is provided. A common point connection 320 to each AC power phase winding 190, 191, 192 for connection to a common star point is provided. An input connection 330 to each pair of DC excitation coils 150, 160, 170, 180 mounted on the part cores 120, 140 is provided.

The relationship of % reduced voltage and corresponding % starting current values and torque values are shown in the table below and also on FIG. 6;

| Voltage tap | Starting current | Starting torque |
|---|---|---|
| 50% | 50% | 25% |
| 65% | 65% | 42% |
| 80% | 80% | 64% |

Figure 7:
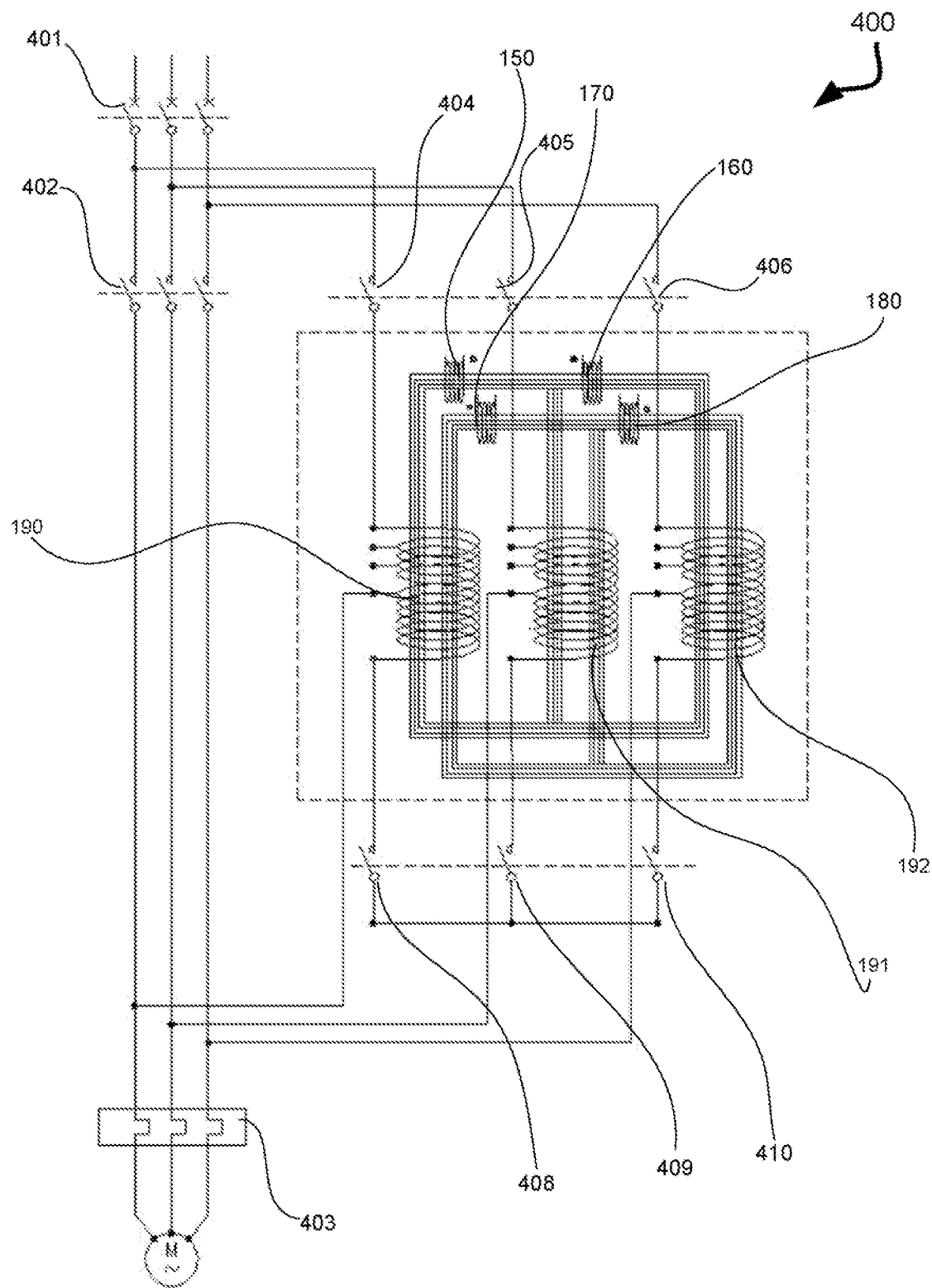
FIG. 7 is a schematic circuit diagram of the apparatus of FIG. 5.

Referring to FIG. 7, a schematic circuit diagram of the apparatus 110 of FIG. 5 is shown. The system 400 comprises a circuit that is similar to the prior art Korndorfer closed transition configuration. The system 400 has three (single coil) AC power phase windings 190, 191, 192 which are continuous (single). The system 400 also has a common point with a star switch 408, 409, 410. There is also a main switch 401, a bypass contactor 402 and motor overload relay 403. The motor overload relay 403 may be a thermal or an electronic relay. There are transformer contacts 404, 405, 406. The transformer contacts 404, 405, 406 may be a solid state type or electromechanical type.

Figure 8:
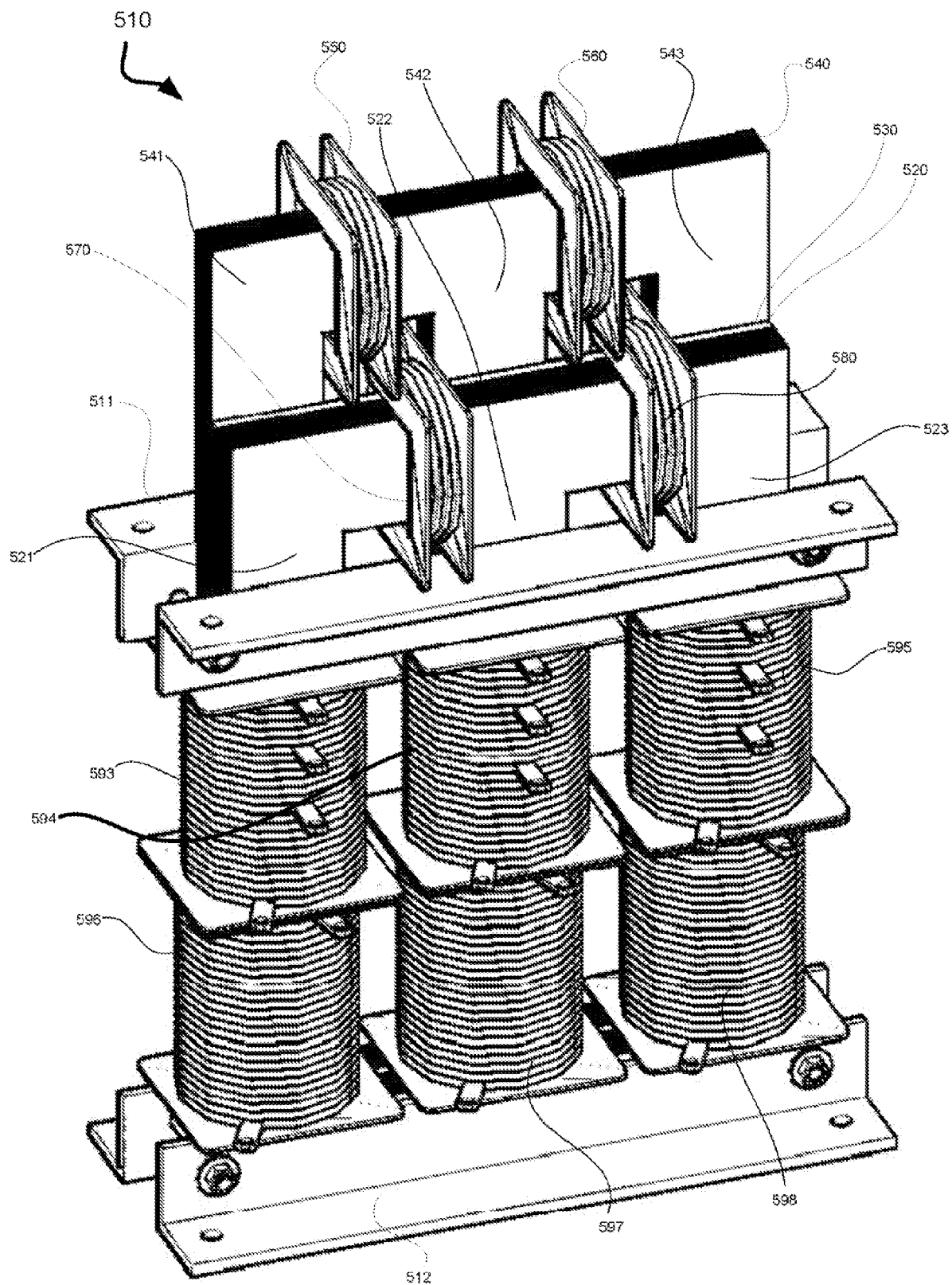
FIG. 8 is a perspective view of a 3-coil variable reactor/auto-transformer apparatus for use in a polyphase induction motor starter according to a third embodiment of the present invention.
Figure 9:
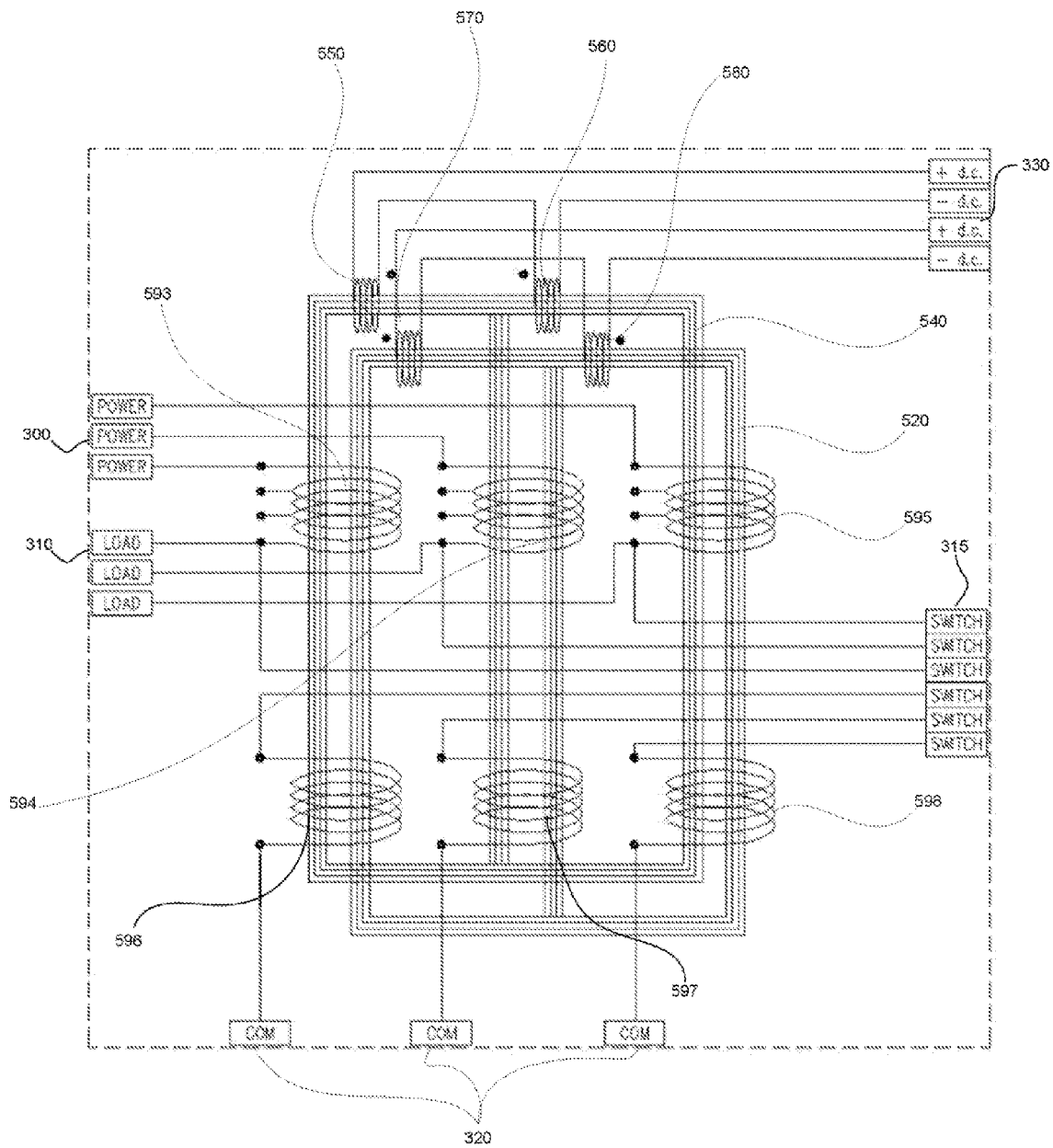
FIG. 9 is an electrical diagram of the apparatus of FIG. 8.
Figure 10:
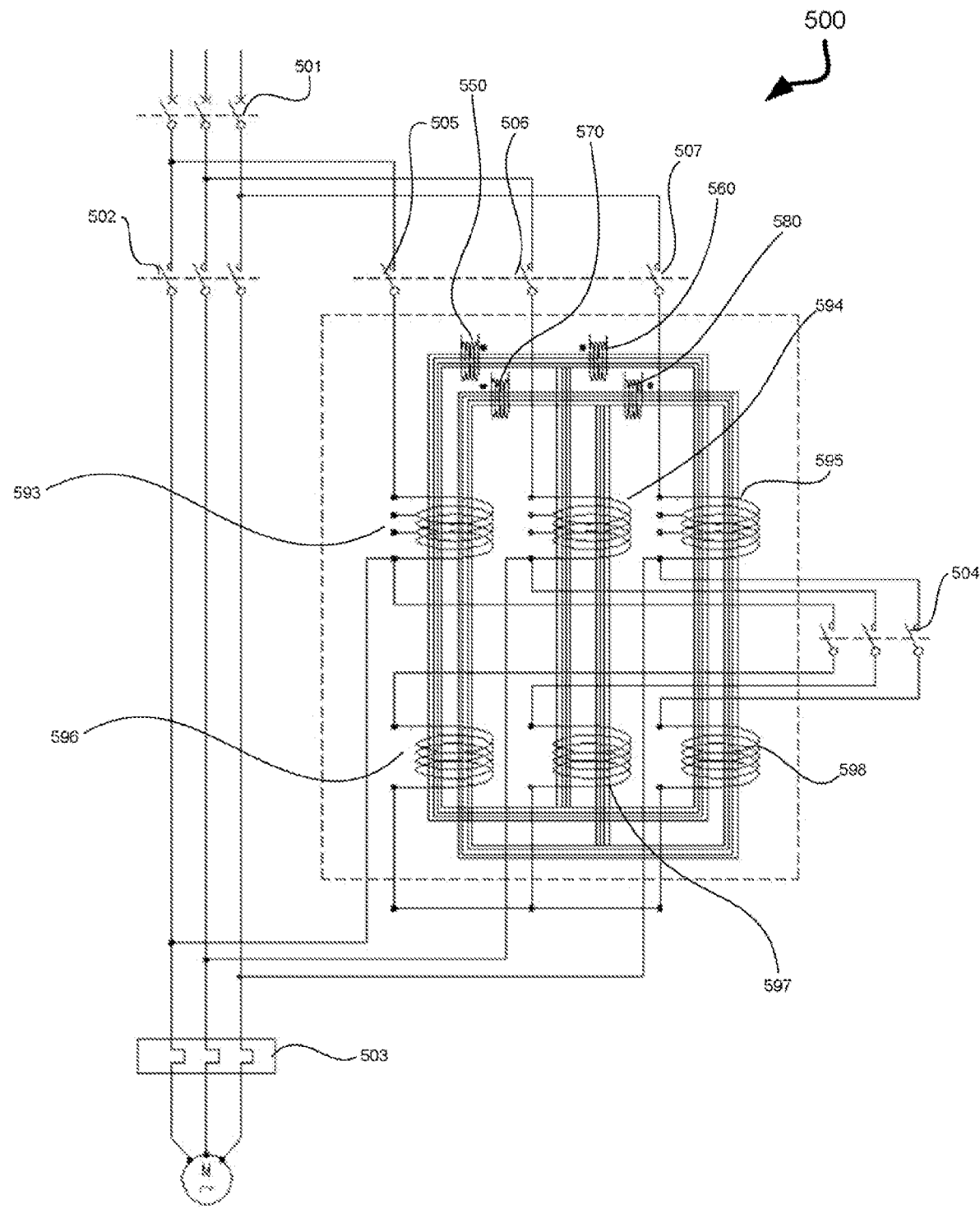
FIG. 10 is a schematic circuit diagram of the apparatus of FIG. 8.

Referring to FIGS. 8 to 10, a 3-coil, variable reactor/auto-transformer apparatus 510 in accordance with a third embodiment is shown. Turning to FIG. 9, a schematic circuit diagram of the apparatus 510 of FIG. 8 is shown. The system 500 comprises a circuit that is similar to the prior art Korndorfer closed transition configuration, and has two separate coils for each AC power phase winding. The two coils are an upper coil 593, 594, 595 with a plurality of voltage taps, and a tower coil 596, 597, 598 of equal number of turns as the upper coil 593, 594, 595. There is a magnetic core assembly comprising at least two part cores 520, 540. A pair of DC excitation coils 570, 580 is wound around first part core 520. Another pair of DC excitation coils 550, 560 is wound around second part core 540. An input connection 300 to each upper coil 593, 594, 595 of AC power phase windings is provided for connection to an AC power system.

An output connection 310 to a load from selected voltage taps of the upper coil 593, 594, 595 of AC power phase windings and to centre switch terminals is provided. A common point connection 320 to each lower coil of AC power phase windings 596, 597, 598 for connection to a common star point is provided. An input connection 330 to each pair of DC excitation coils 550, 560, 570, 580 mounted on the first and second part cores 520, 540 is provided. An output connection 315 to centre switch terminals is provided. The centre switch terminals enable switching the circuit from the auto-transformer connection of the first starting step to the variable reactor connection of the second starting stage. There is also a main switch 501, a bypass contactor 502 and motor overload relay 503. The motor overload relay 503 may be a thermal or an electronic relay. There are transformer contacts 505, 506, 507. The transformer contacts 505, 506, 507 may be a solid state type or electromechanical type. The system 500 also has a common point 504 that is hard wired.

Figure 11:
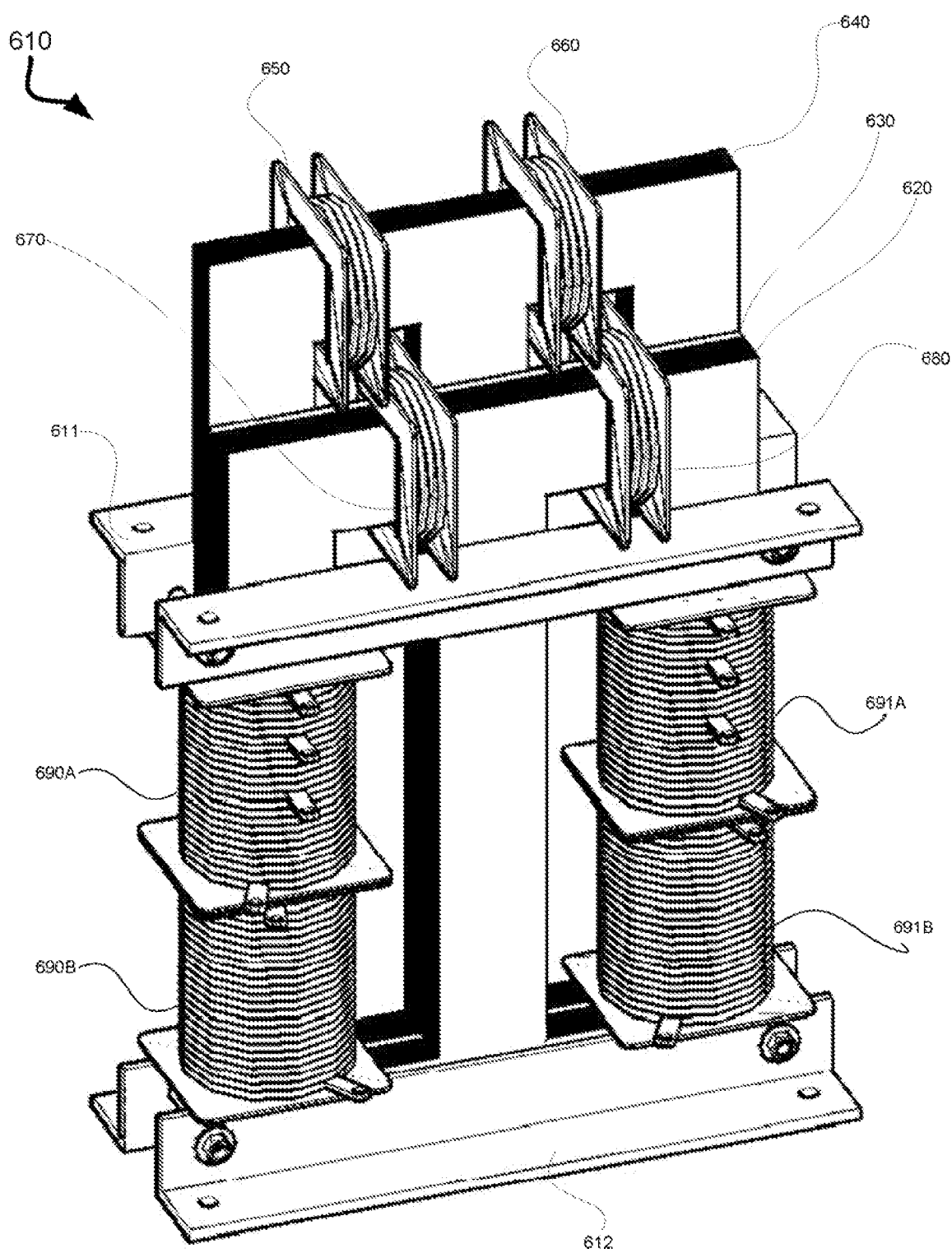
FIG. 11 is a perspective view of a 2-coil variable reactor/auto-transformer apparatus for use in a polyphase induction motor starter according to a fourth embodiment of the present invention.
Figure 12:
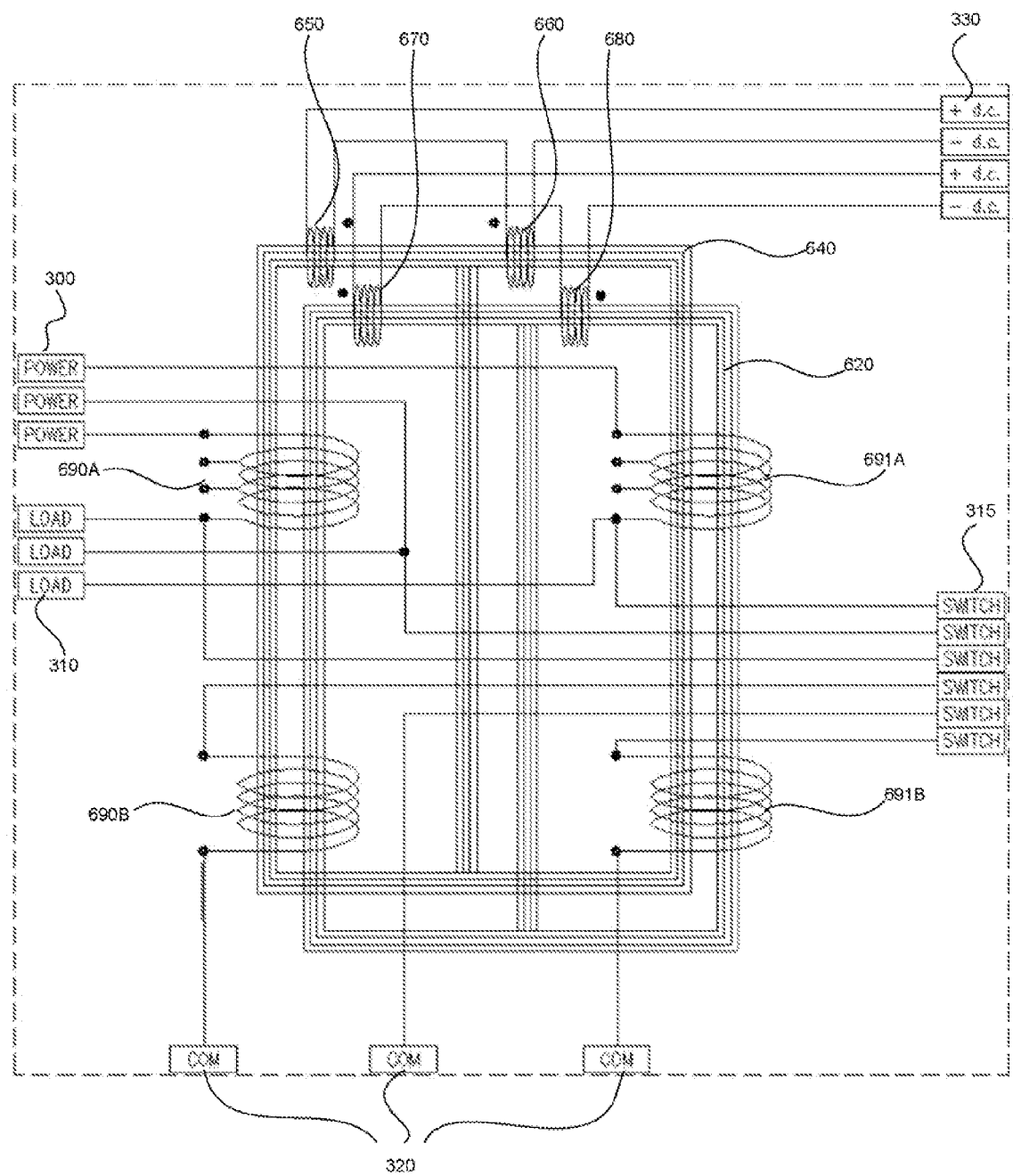
FIG. 12 is an electrical diagram of the apparatus of FIG. 11.
Figure 13:
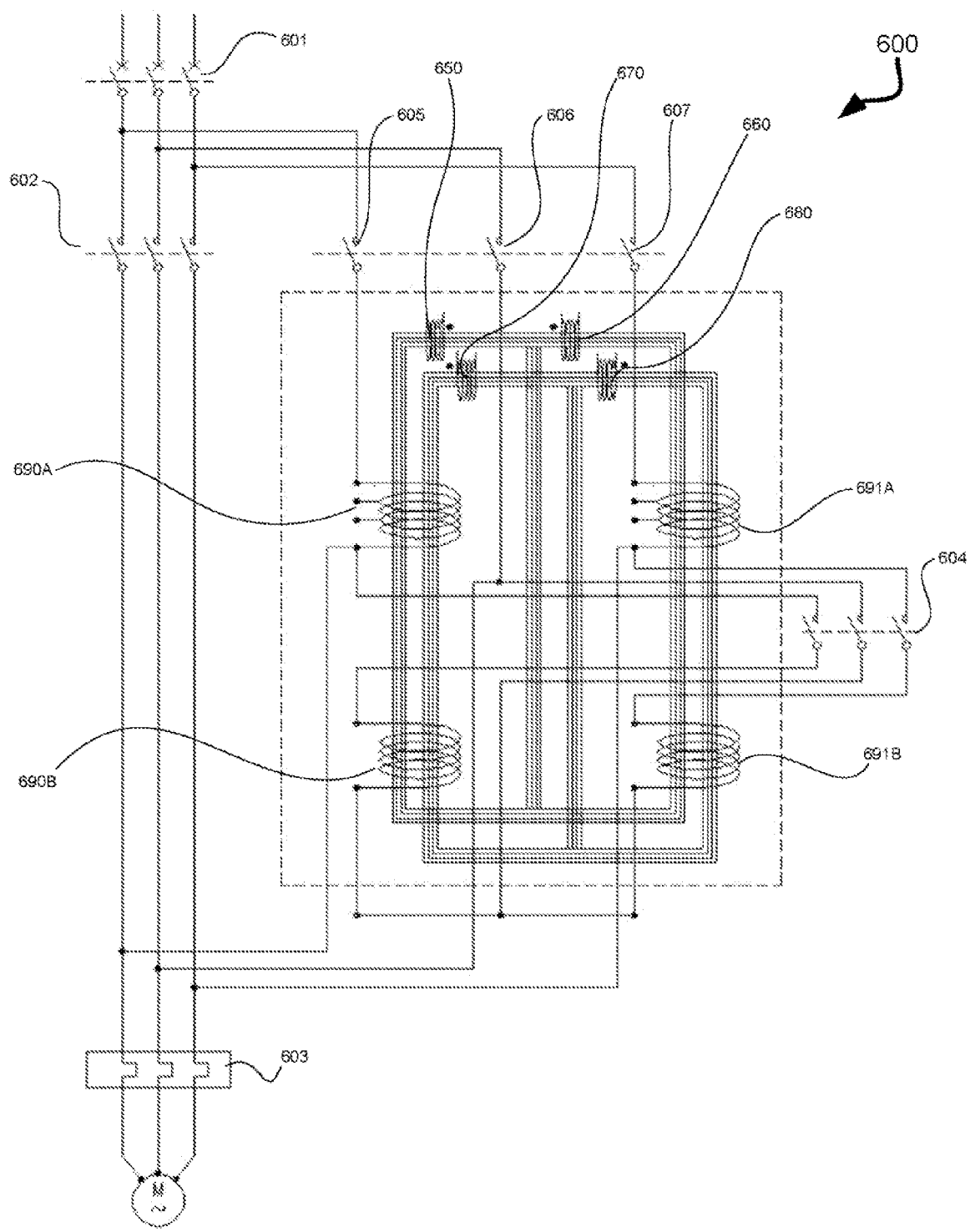
FIG. 13 is a schematic circuit diagram of the apparatus of FIG. 11.

Referring to FIGS. 11 to 13, a perspective view of a 2-coil variable reactor/auto-transformer apparatus 610 according to a fourth embodiment is shown. The system 600 comprises a circuit that is similar to the prior art Korndorfer closed transition configuration, with two separate coils for each AC power phase winding 690A, 690B, 691A, 691B. The two coils are an upper coil 690A, 690B with a plurality of voltage taps, and a lower coil 691A, 691B of equal number of turns. There is centre switch terminal to enable switching the circuit from the auto-transformer connection of the first starting step to the variable reactor connection of the second starting stage. There is also a main switch 601, a bypass contactor 602 and motor overload relay 603. The motor overload relay 603 may be a thermal or an electronic relay. There are transformer contacts 605, 606, 607. The transformer contacts 605, 606, 607 may be a solid state type or electromechanical type. The system 600 also has a common point 604 that is hard wired.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed:

1. An apparatus for controlling the starting and stopping of an AC induction motor, the apparatus comprising:
   a first magnetic permeable portion having first, second and third legs;
   a second magnetic permeable portion arranged relative to the first magnetic permeable portion such that a magnetic control flux of the second magnetic permeable portion has an opposite magnetic polarity to a magnetic control flux of the first magnetic permeable portion, the second magnetic permeable portion having fourth, fifth and sixth legs;
   a non-magnetic spacer separating the first and second magnetic permeable portions to prevent magnetic control flux cancellation between the first and second magnetic permeable portions;
   a first AC power phase winding wound around the first and fourth legs;
   a second AC power phase winding wound around the third and sixth legs;

a first pair of DC excitation control windings mounted around the first magnetic permeable portion; and a second pair of DC excitation control windings mounted around the second magnetic permeable portion;

wherein a magnetic power flux opposes the magnetic control flux in the first magnetic permeable portion and a magnetic power flux assists a magnetic control flux in the second magnetic permeable portion during a first half cycle, and a magnetic power flux assists a magnetic control flux in the first magnetic permeable portion and a magnetic power flux opposes a magnetic control flux in the second magnetic permeable portion during a second half cycle, such that the impedance of the AC power phase windings is changed by an equal and symmetrical variation of the density of the combined magnetic fluxes in each of the magnetic permeable portions during a complete power cycle to produce a balanced voltage with a symmetrical waveform from each of the AC power phase windings.

2. The apparatus according to claim 1, further comprising a third AC power phase winding wound around the second the fifth legs.

3. The apparatus according to claim 1, wherein the DC excitation control windings all have the same number of turns.

4. The apparatus according to claim 1, wherein each magnetic permeable portion comprises:

an upper cross-bar yoke connecting an upper portion of each leg, and a lower cross-bar yoke connecting a lower portion of each leg.

5. The apparatus according to claim 1, wherein each AC power phase winding have substantially equal magnetic saturation levels.

6. The apparatus according to claim 1, wherein the AC power phase winding is a single continuous winding with a plurality of voltage taps.

7. The apparatus according to claim 1, wherein the AC power phase winding is at least two separate coils having an equal number of turns, each coil having a plurality of voltage taps.

8. The apparatus according to claim 7, further comprising a switch connected at a 50% voltage tap of each AC power phase winding to reduce stress on insulation of the AC power phase winding.

9. The apparatus according to claim 1, further comprising a third magnetic permeable portion, the third magnetic permeable portion omitting DC excitation control windings.

10. The apparatus according to claim 9, wherein the third magnetic permeable portion has an air gap and is isolated by non-magnetic spacers to prevent magnetic control flux cancellation between the first and second magnetic permeable portions.

11. The apparatus according to claim 1, wherein the DC excitation control windings are a plurality of control windings for inducing magnetic control fluxes in the magnetic permeable portions, and the flow of magnetic control flux in the magnetic permeable portions have substantially equal flux densities and the magnetic flux flows in the first magnetic permeable portion in opposition to the second magnetic permeable portion.

12. The apparatus according to claim 4, wherein the first pair of DC excitation control windings is wound around the upper cross-bar yoke of the first magnetic permeable portion between the first and second legs and between the second and third legs, and the second pair of DC excitation control windings is wound around the upper cross-bar yoke of the second magnetic permeable portion between the fourth and fifth legs and between the fifth and sixth legs.

13. The apparatus according to claim 12, wherein the first pair of DC excitation control windings are connected in series and supplied with DC amperes, and the DC amperes induce a magnetic control flux to flow in an upwardly direction on the second leg, and in a downwardly direction on the first and third legs.

14. The apparatus according to claim 12, wherein the second pair of DC excitation control windings are connected in series and supplied with DC amperes, and the DC amperes induce a magnetic control flux to flow in an downwardly direction on the fifth leg, and in a upwardly direction on the fourth and sixth legs.

15. The apparatus according to claim 1, further comprising;

an input connection to the AC power phase windings for connection to a three phase AC power system;

an output connection to a load from selected reduced voltage taps of the AC power phase windings;

a common connection to each A.C. power phase winding for connection to a common circuit point; and an input connection to each pair of DC excitation control windings.

* * * * *